(12) United States Patent
Uemura et al.

(10) Patent No.: US 11,509,012 B2
(45) Date of Patent: Nov. 22, 2022

(54) THIN-TYPE BATTERY

(71) Applicant: FDK CORPORATION, Tokyo (JP)

(72) Inventors: Ayano Uemura, Tokyo (JP); Rei Hanamura, Tokyo (JP)

(73) Assignee: FDK CORPORATION, Tokyo (JP)

( * ) Notice: Subject to any disclaimer, the term of this patent is extended or adjusted under 35 U.S.C. 154(b) by 141 days.

(21) Appl. No.: 17/031,895

(22) Filed: Sep. 25, 2020

(65) Prior Publication Data

US 2021/0013462 A1 Jan. 14, 2021

Related U.S. Application Data

(63) Continuation of application No. PCT/JP2018/046762, filed on Dec. 19, 2018.

(30) Foreign Application Priority Data

Mar. 28, 2018 (JP) .............................. JP2018-062048

(51) Int. Cl.
*H01M 50/183* (2021.01)
*H01M 50/124* (2021.01)
(Continued)

(52) U.S. Cl.
CPC ....... *H01M 50/183* (2021.01); *H01M 50/116* (2021.01); *H01M 50/124* (2021.01); *H01M 50/531* (2021.01)

(58) Field of Classification Search
CPC ............. H01M 50/183; H01M 50/116; H01M 50/124; H01M 50/531; H01M 50/105;
(Continued)

(56) References Cited

U.S. PATENT DOCUMENTS

2010/0291423 A1* 11/2010 Hideo ............... H01M 50/3425
429/82
2011/0003198 A1 1/2011 Noda et al.

FOREIGN PATENT DOCUMENTS

CN 205406574 U 7/2016
JP H11-219689 A 8/1999
(Continued)

OTHER PUBLICATIONS

English translation of JP-2017118017-A (Year: 2017).*
(Continued)

*Primary Examiner* — Ula C Ruddock
*Assistant Examiner* — Serika Gupta
(74) *Attorney, Agent, or Firm* — Isshiki & Partners; Joseph P. Farrar (57) ABSTRACT

A thin-type battery includes: a flat shaped electrode body formed by stacking a positive electrode and a negative electrode while interposing a separator in between; an electrolyte; and an exterior body made from a laminate film, the exterior body enclosing the electrode body and the electrolyte with ends of the exterior body being hermetically sealed by heat-sealing, wherein the exterior body includes a folded part to be folded from one surface side to another surface side of the electrode body and to extend along an edge of the electrode body, and the folded part includes resin-interposed heat-sealing portions located in regions in two ends in a direction along the edge of the electrode body and outside the electrode body, where portions of the exterior body are opposed to each other, each resin-interposed heat-sealing portion being heat-sealed by interposing a piece made from a resin.

4 Claims, 6 Drawing Sheets (51) Int. Cl.
*H01M 50/531* (2021.01)
*H01M 50/116* (2021.01)

(58) Field of Classification Search
CPC ............. H01M 50/119; H01M 50/121; H01M 50/129; H01M 50/136; H01M 50/178; H01M 50/184; H01M 50/188; H01M 50/193; H01M 50/197; H01M 50/55; H01M 6/40; Y02P 70/50; Y02E 60/10
See application file for complete search history.

(56) References Cited

FOREIGN PATENT DOCUMENTS

| | | | |
|---|---|---|---|
| JP | 2010-267593 | A | 11/2010 |
| JP | 2016-081567 | A | 5/2016 |
| JP | 2017-118017 | A | 6/2017 |
| JP | 2017118017 | A * | 6/2017 |
| WO | 2009/113470 | A1 | 9/2009 |

OTHER PUBLICATIONS

International Search Report (ISR) for Application No. PCT/JP2018/046762 dated Mar. 12, 2019.
English Translation of the ISR for Application No. PCT/JP2018/046762 dated Mar. 12, 2019.
Written Opinion of the International Search Authority for Application No. PCT/JP2018/046762 dated Mar. 12, 2019.
Partial translation of Written Opinion of the International Search Authority for Application No. PCT/JP2018/046762 dated Mar. 12, 2019.
Office Action in Japanese Patent Application No. 2018-062048, dated Mar. 28, 2022.
English Translation of the Office Action in Japanese Patent Application No. 2016-062048.
Office Action in corresponding Taiwanese Patent Application No. 108102972, dated May 16, 2022.
English Translation of the Office Action in corresponding Taiwanese Patent Application No. 108102972.

* cited by examiner

THIN-TYPE BATTERY

CROSS-REFERENCE TO RELATED APPLICATIONS

This is a continuation application of International Patent Application No. PCT/JP2018/046762 filed Dec. 19, 2018, which claims the benefit of priority to Japanese Patent Application No. 2018-062048 filed Mar. 28, 2018, the entire contents of each of which are hereby incorporated herein by reference.

BACKGROUND

Technical Field

This disclosure relates to a thin-type battery that uses a laminate film as an exterior body.

Description of the Related Art

There has been known a thin-type battery that uses a laminate film as an exterior body (see Japanese Patent Application Publication No. 11-219689, for example). This thin-type battery is fabricated, for example, by preparing an aluminum laminate sheet tubular body by bending a rectangular aluminum laminate sheet into a tubular shape and heat-sealing two ends in a longitudinal direction that are overlapped with each other, enclosing a thin flat power generating body into the tubular body, and heat-sealing two openings of the tubular body. In this thin-type battery, a region where the ends of the aluminum laminate sheet are overlapped and heat-sealed is located in a position opposed to one of surfaces of the rectangular power generating body enclosed in the aluminum laminate sheet. Moreover, there are two pairs of edges that define sets of parallel sides of an outer peripheral portion of the power generating body formed into a rectangular shape. Here, bent portions where the aluminum laminate sheet is bent are located at one of the pairs of edges. Meanwhile, the two openings of the tubular body are located on the other pair of edges, where portions of the aluminum laminate sheet are overlapped and heat-sealed together.

In the thin-type battery mentioned above, two ends of each portion where the opening of the tubular body is heat-sealed are portions where the aluminum laminate sheet is folded from one surface side of the thin flat power generating body to the other surface side thereof and these folded portions are overlapped with each other. Accordingly, a gap between these folded portions is prone to spread due to resilience of the aluminum laminate sheet and the aluminum laminate sheet may fail to be fully heat-sealed as a consequence. Meanwhile, if the aluminum laminate sheet is folded with a greater force against the resilience of the aluminum laminate sheet, an aluminum element in the sheet may be damaged and potentially cause a leakage of an electrolytic solution therein.

This disclosure has been made in view of the aforementioned problems and an objective thereof is to provide a thin-type battery including a heat-sealing portion obtained by heat-sealing folded regions of an exterior body, which hardly causes a liquid leakage.

SUMMARY

An aspect of the present disclosure to achieve the above objective is a thin-type battery comprising: a flat shaped electrode body formed by stacking a positive electrode and a negative electrode while interposing a separator in between the positive electrode and the negative electrode; an electrolyte; and an exterior body made from a laminate film including a metal foil and enclosing the electrode body and the electrolyte with ends of the exterior body being hermetically sealed by heat-sealing. The exterior body includes a folded part to be folded from one surface side to another surface side of the electrode body and to extend along an edge of the electrode body, and the folded part includes resin-interposed heat-sealing portions located in regions in two ends in a direction along the edge of the electrode body and outside the electrode body where portions of the exterior body are opposed to each other. Each resin-interposed heat-sealing portion being heat-sealed by interposing a heat-sealing piece made from a hot-melt synthetic resin.

Preferably, the electrode body may have a rectangular shape, and in the exterior body, the folded part may be located along the edge forming one of four sides of the electrode body, and regions overlapping each other to outside of the remaining three sides of the electrode body may be hermetically sealed by heat-sealing.

Preferably, the heat-sealing piece may be made from polypropylene.

Preferably, a tab lead may be attached to each of the positive electrode and the negative electrode, and the heat-sealing piece may be a tab film included in the tab lead.

According to this disclosure, it is possible to provide a thin-type battery including a heat-sealing portion obtained by heat-sealing folded regions of an exterior body, which hardly causes a liquid leakage.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, thin-type batteries according to embodiments of the present disclosure are described. As used herein, the singular forms "a", "an", and "the" are intended to include the plural forms as well, unless the context clearly indicates otherwise.

An embodiment of this disclosure will be described below with reference to the accompanying drawings.

Configuration of Thin-Type Battery

A thin-type battery 1 according to an embodiment of this disclosure is a thin-type battery representing an aspect of a primary battery, a secondary battery, or the like, which is formed by hermetically sealing an electrode body in a flat rectangular shape and an electrolytic solution in an exterior body made from a laminate film.

Figure 1:
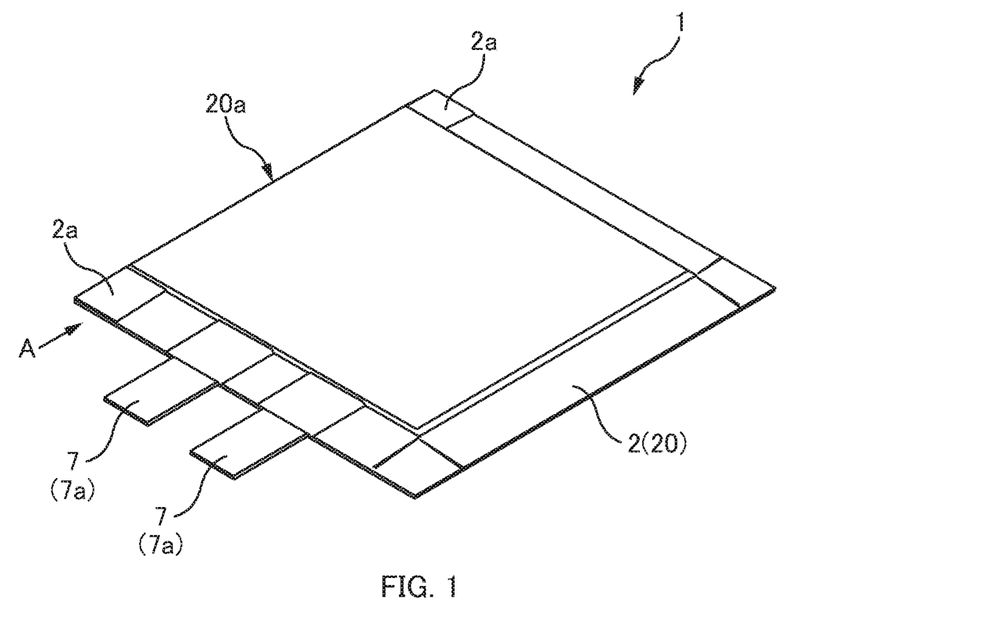
FIG. 1 is a perspective view showing external appearance of a thin-type battery according to an embodiment of this disclosure.

As shown in FIG. 1, the thin-type battery 1 according to the embodiment of this disclosure has an external shape like a flat plate, and is hermetically sealed in an exterior body 2 made from a laminate film 20.

Figure 2:
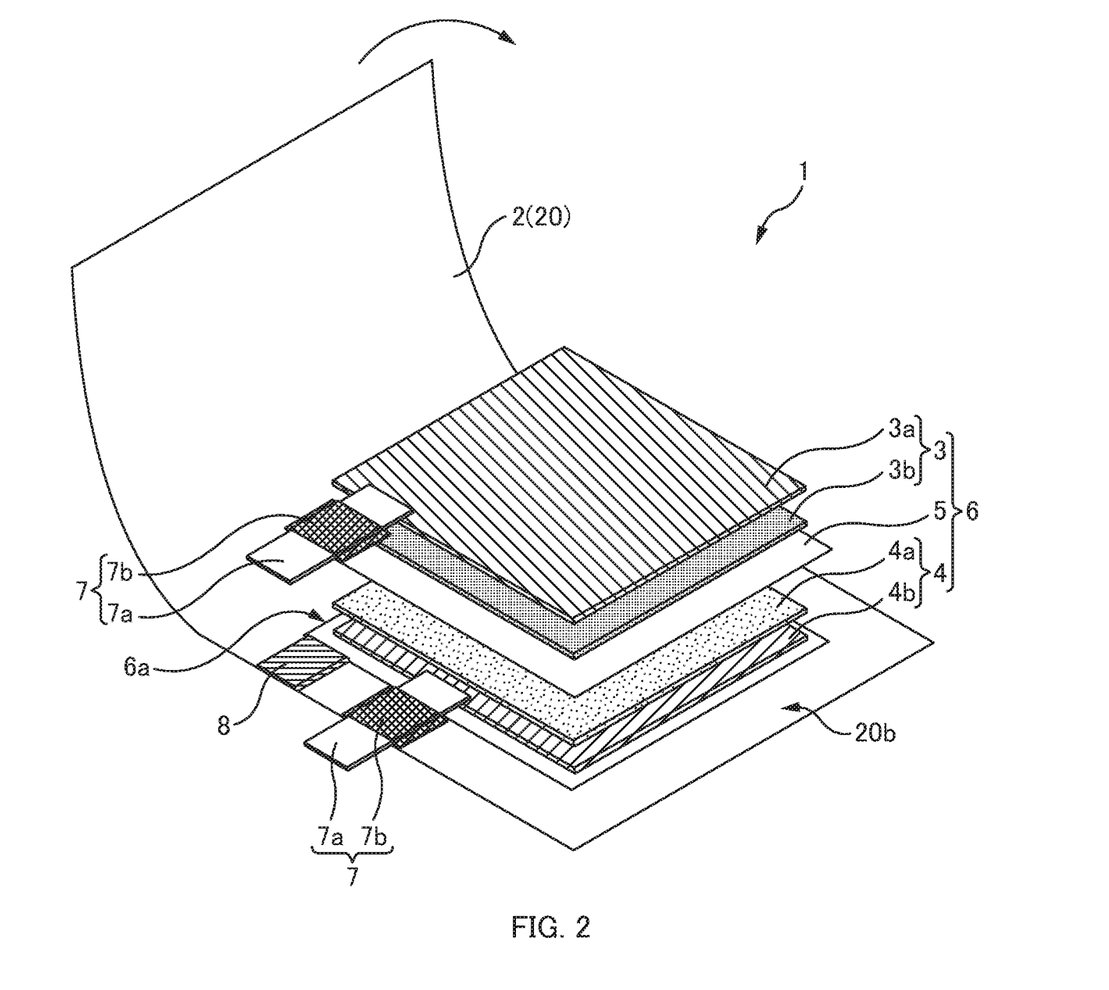
FIG. 2 is a perspective view showing a configuration of the thin-type battery according to the embodiment of this disclosure.

As shown in FIG. 2, in the thin-type battery 1, an electrode body 6 formed by stacking a sheet-shaped positive electrode 3 and a sheet-shaped negative electrode 4 while interposing a separator 5 in between is sealed in the exterior body 2 together with an electrolytic solution. The positive electrode 3 is formed by disposing a positive electrode material 3b containing a positive electrode active material on one principal surface of a positive electrode current collector 3a that is made from a metal plate or a metal foil, and the negative electrode 4 is formed by disposing a negative electrode material 4b containing a negative electrode active material on one principal surface of a negative electrode current collector 4a that is made from a metal plate or a metal foil. The electrode body 6 is formed by stacking and pressure-bonding the positive electrode 3 and the negative electrode 4 via the separator 5 (or heat-sealing the positive electrode 3 and the negative electrode 4 to the separator 5) such that the respective electrode materials (3b and 4b) are opposed to each other.

Tab leads 7 are attached to the respective electrode current collectors (3a and 4a) of the positive electrode 3 and the negative electrode 4. Each tab lead 7 has a structure in which a tab film 7b made of an insulating resin having a heat-sealing property is heat-sealed in the middle of extension of a strip-shaped terminal lead 7a, which is made from a metal plate or a metal foil and serves as a substantive electrode terminal strip, in such a way as to sandwich the terminal lead 7a.

One of ends of the terminal lead 7a formed into the strip shape is exposed to outside of the exterior body 2 as an electrode terminal strip of the positive electrode 3 or an electrode terminal strip of the negative electrode 4, while the other end thereof is coupled to the positive electrode current collector 3a or the negative electrode current collector 4a by means of ultrasonic fusion bonding and the like.

The exterior body 2 is made from the single laminate film 20 having a rectangular shape, which is folded from a surface on one side of the electrode body 6 to a surface on the other side thereof. The electrode body 6 is placed into the folded single laminate film 20.

Figure 3A:
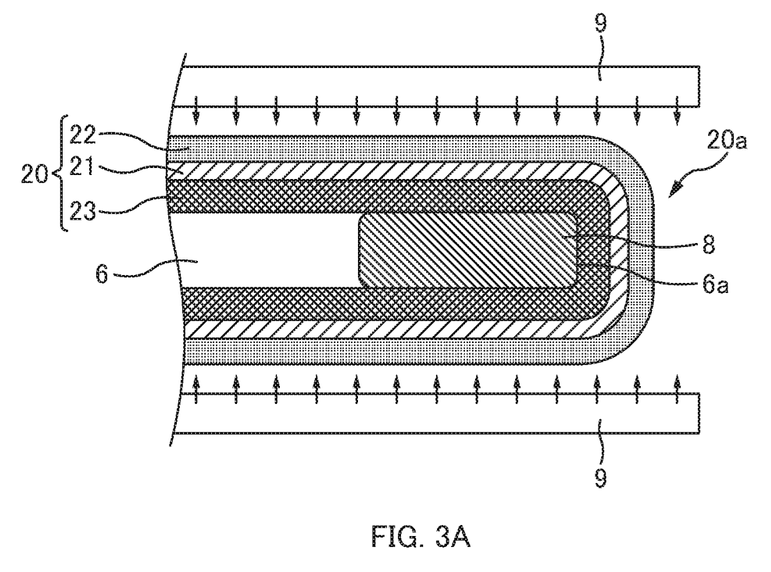
FIG. 3A is a schematic diagram showing a state before heat-sealing, which is viewed from a direction indicated with an arrow A in FIG. 1.

As shown in FIG. 3A, the laminate film 20 has a structure in which one or more resin layers are stacked on top and bottom of a base material 21 made of a metal foil such as an aluminum foil. In this structure, a protection layer 22 made of polyamide resin, for example, is stacked on one surface of the base material 21 while a heat-sealing layer 23 having a heat-sealing property such as polypropylene, for example, is stacked on the other surface thereof.

A folded part 20a being a bent part of the folded single laminate film 20 is located along an edge 6a that forms one of four sides of the electrode body 6 in the rectangular shape. Moreover, peripheral regions 20b overlapped with each other on the outside of edges forming the remaining three sides of the electrode body 6 are heat-sealed with each other by thermal compression bonding. Thus, the inside of the laminate film 20 is hermetically sealed.

As shown in FIGS. 1 and 2, the thin-type battery 1 of this embodiment includes resin-interposed heat-sealing portions 2a, which are located at two ends of the folded part 20a of the laminate film 20 in a direction along the edge 6a of the electrode body 6 and at regions outside the electrode body 6 where folded portions of the laminate film 20 are opposed to each other. Each resin-interposed heat-sealing portion 2a is formed by inserting a heat-sealing piece 8, which is made of a hot-melt synthetic resin, between the folded portions of the laminate film 20. The heat-sealing piece 8 is heat-sealed to the laminate film 20 when the peripheral regions 20b of the laminate film 20 are heat-sealed to each other. In this embodiment, the heat-sealing piece 8 made of the hot-melt synthetic resin is made from polypropylene which is the same material as the material of the heat-sealing layer 23 of the laminate film 20, for example.

Method of Manufacturing Thin-Type Battery

In manufacturing the thin-type battery 1 of this embodiment, the single laminate film 20 having the rectangular shape is placed while setting the heat-sealing layer 23 side to an inner surface, and then the electrode body 6 is displaced to one side in the longitudinal direction and disposed on the laminate film 20. In this instance, the electrode body 6 is disposed such that the edge 6a forming one of the four sides of the electrode body 6 is located at the center in the longitudinal direction and is orthogonal to the longitudinal direction.

Next, a region of the laminate film 20 on the side where the electrode body 6 is not disposed is folded back to the electrode body 6 side. Hence, the electrode body 6 is sandwiched between the portions of the laminate film 20 that are folded and opposed to each other. In this instance, as shown in FIG. 3A, the heat-sealing piece 8 is inserted between the folded portions of the laminate film 20 at each of the two ends of the folded part 20a of the laminate film 20 in the direction along the edge 6a of the electrode body 6.

Figure 3B:
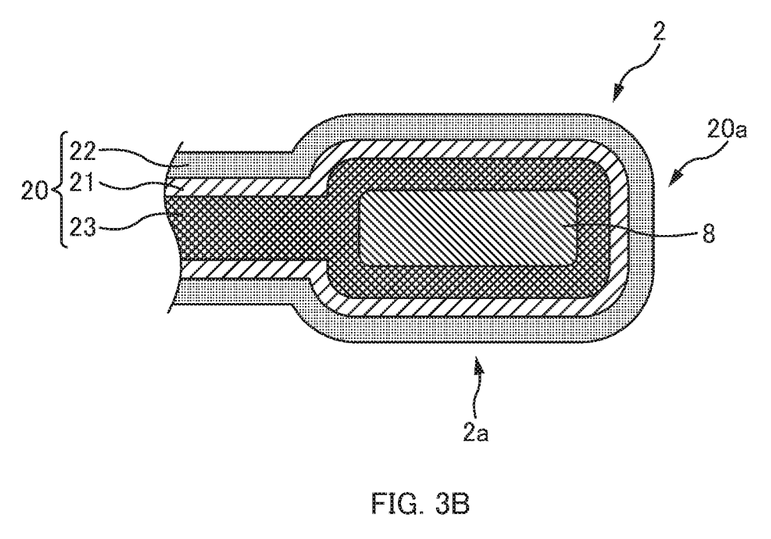
FIG. 3B is a schematic diagram showing a state after the heat-sealing, which is viewed from the direction indicated with the arrow A in FIG. 1.

Next, the peripheral regions 20b of the laminate film 20 opposed to each other are subjected to thermal compressing bonding together with the heat-sealing pieces 8 by using heater bars 9, thereby forming the exterior body 2 in a flat bag shape. Thus, the thin-type battery 1 provided with the resin-interposed heat-sealing portions 2a at the peripheral regions 20b of the folded part 20a is finished as shown in FIG. 3B. At the time of this thermal compression bonding, the tab films 7b on the terminal leads 7a of the tab leads 7 projecting from the edge of the laminate film 20 are heat-sealed to the peripheral regions 20b of exterior body 2 together with the laminate film 20. Thus, the tab films 7b heat-sealed to the terminal leads 7a are also heat-sealed to the heat-sealing layer 23 of the laminate film 20.

Effects of Thin-type Battery According to Embodiment

Figure 4:
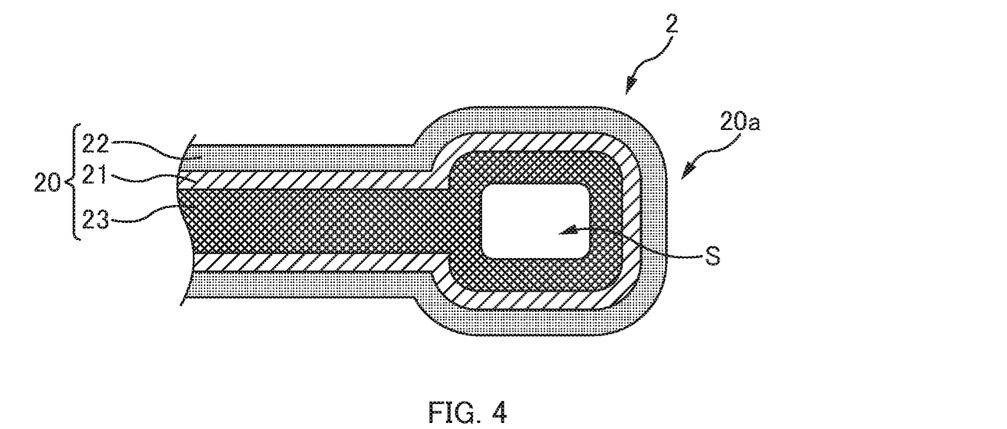
FIG. 4 is a schematic diagram to explain an unsealed space.

According to the thin-type battery 1 of this embodiment, the exterior body 2 includes the resin-interposed heat-sealing portions 2a in which the heat-sealing pieces 8 are interposed and heat-sealed to the two ends in the direction along the edge 6a of the electrode body 6 in the folded part 20a. For this reason, even when the ends of the laminate film 20 in the folded portion 20a opposed to each other do not easily come close to each other due to the resilience of the laminate film 20, the heat-sealing piece 8 interposed in between is melted so as to bury a space formed in the folded portion of the laminate film 20. As a consequence, an unsealed space S shown in FIG. 4 will not be formed at the folded part 20a and the peripheral regions 20b at the folded part 20a can be hermetically sealed more reliably.

Figure 5:
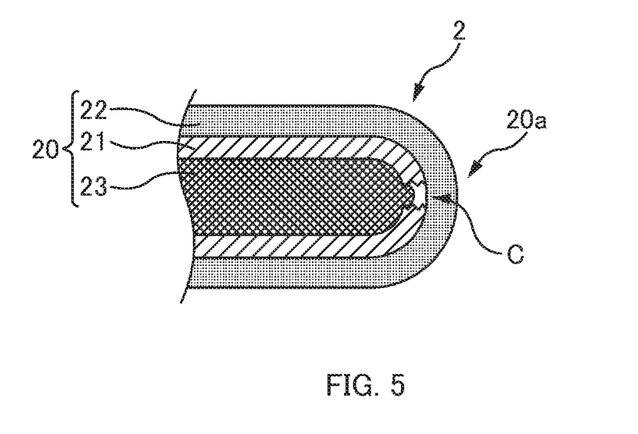
FIG. 5 is a schematic diagram to explain the occurrence of a crack.

Meanwhile, by interposing the heat-sealing pieces 8, the laminate film 20 is bent more gently. Therefore, the laminate film 20 does not have to be folded with a greater force against the resilience of the laminate film 20. As a consequence, the metal foil such as an aluminum foil forming the base material of the laminate film 20 will not develop damage such as a crack C as shown in FIG. 5. Thus, it is possible to prevent the occurrence of a leakage of a liquid such as the electrolytic solution.

Moreover, the exterior body 2 is hermetically sealed by heat-sealing the peripheral regions 20b, which are overlapped with each other on the outside of the remaining three sides of the electrode body 6 except the folded part 20a located along the edge 6a that forms one of the four sides of the electrode body 6. For this reason, it is possible to reduce a surrounding region to be heat-sealed by an amount equivalent to the folded part 20a as compared to a thin-type battery to be formed by sandwiching an electrode body between two laminate films and heat-sealing four sides, for example. This makes it possible to increase the size of the electrode body 6 that can be disposed in the available area, and thus to provide the thin-type battery 1 with higher energy density.

In the meantime, since the heat-sealing pieces 8 are made of polypropylene which is the same material as the material of the heat-sealing layer 23 of the laminate film 20, and the melting temperature of the heat-sealing pieces 8 and the heat-sealing layer 23 are the same, it is possible to achieve hermetic sealing more reliably.

Modified Example of Thin-Type Battery

Figure 6:
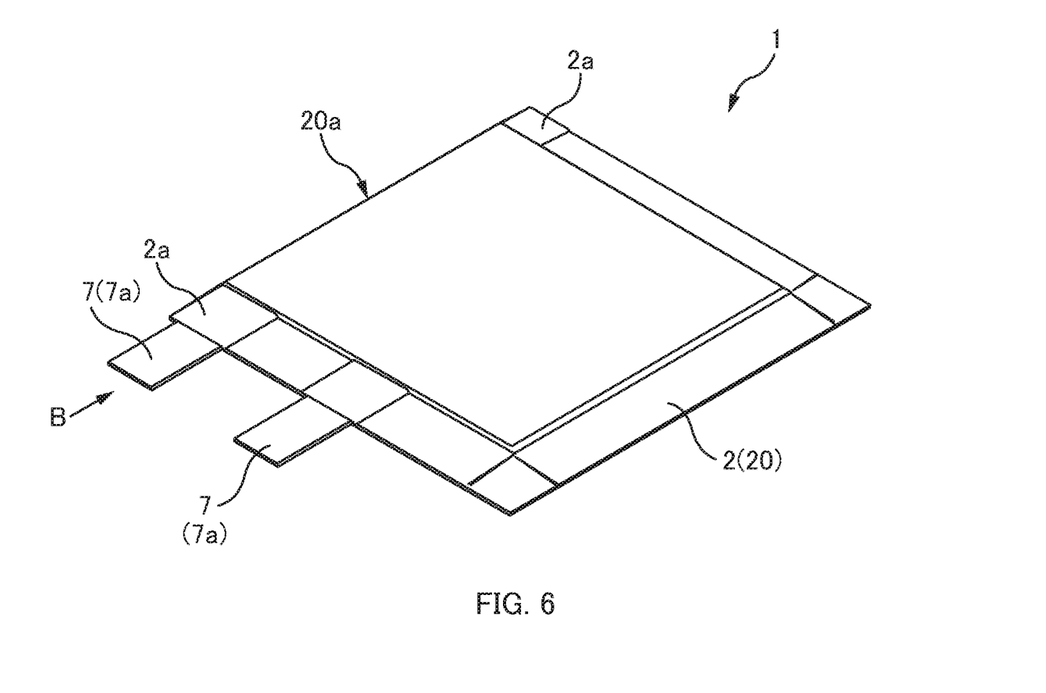
FIG. 6 is a perspective view showing external appearance of a modified example of the thin-type battery according to the embodiment of this disclosure.
Figure 7:
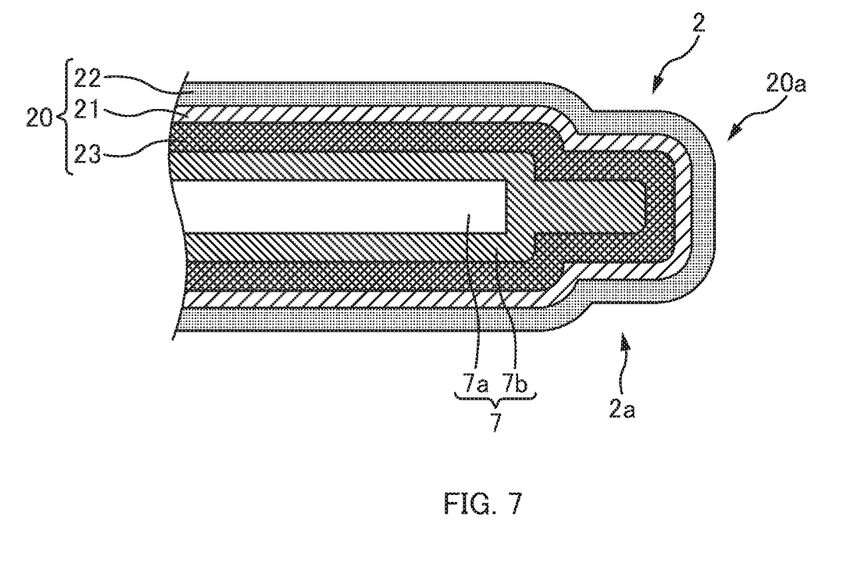
FIG. 7 is a schematic diagram showing a state after heat-sealing, which is viewed from a direction indicated with an arrow B in FIG. 6.

The above-described embodiment has discussed the example of forming the resin-interposed heat-sealing portions 2a by inserting the heat-sealing pieces 8 in the two ends of the folded part 20a of the laminate film 20 in the direction along the edge 6a of the electrode body 6. However, this disclosure is not limited only to this configuration. For example, as shown in FIGS. 6 and 7, the tab film 7b on the terminal lead 7a that projects from the edge of the laminate film 20 in the peripheral regions 20b of the exterior body 2 and is heat sealed may be disposed at one end while the heat-sealing piece 8 may be inserted to the other end. Thus, the resin-interposed heat-sealing portion 2a may be formed by using the tab film 7b.

Meanwhile, the above-described embodiment has discussed the example of the thin-type battery 1 formed by heat-sealing the three sides while folding back the laminate film 20 along the edge 6a that forms one of the sides of the electrode body 6. However, this disclosure is not limited only to this configuration. For example, the thin-type battery 1 may be fabricated by enclosing the electrode body 6 in the laminate film 20 having a tubular body prepared by overlapping and heat-sealing ends in the longitudinal direction of the laminate film 20, and then heat-sealing two openings of the tubular body. In this case, the folded parts 20a of the laminate film 20 are formed along two edges that define a pair of parallel sides in the outer peripheral portion of the rectangular electrode body 6. Accordingly, the heat-sealing pieces 8 may be inserted to or one or more tab films 7b may be disposed in heat-sealing portions of the respective folded parts 20a located at four corners of the electrode body 6. Hence, the resin-interposed heat-sealing portions 2a are formed by heat-sealing these portions.

Validation of Effects

Results of a test for validating the effects of the thin-type battery 1 according to the embodiment are given below.

This test used samples according to this embodiment and two types of comparative samples, and the energy density and the presence of a liquid leakage from the folded parts 20a have been investigated on each sample. Comparative sample 1 represents a thin-type battery that has an exterior body formed by heat-sealing four sides without providing the folded part 20a. Meanwhile, comparative sample 2 represents a thin-type battery that has an exterior body formed by heat-sealing three sides while providing the folded part 20a, but without interposing the heat-sealing pieces 8 into the folded part 20a.

In this test, six thin-type batteries 1 according to the above-described embodiment (hereinafter referred to as embodiment samples) were manufactured. Specifically, each of the thin-type batteries 1 includes the exterior body 2 formed by heat-sealing the three sides while providing the folded part 20a, and the heat-sealing pieces 8 being interposed into the folded part 20a. Meanwhile, six thin-type batteries of each of the two types of comparative samples were manufactured. Then, the energy density and the presence of a liquid leakage were investigated on each of these thin-type batteries.

Specifications of each embodiment sample are as follows.

Positive Electrode

A slurry was prepared by using 94 parts by weight of $Li_2CoO_2$ serving as an active material, 3 parts by weight of acetylene black serving as a conductive material, and 3 parts by weight of PVdF serving as a binder. The slurry was coated on one of surfaces of an aluminum current collector 3a at a basis weight on one surface of 32.5 mg/cm². After drying and pressing processes, the coated current collector 3a was cut out into the positive electrode 3 having dimensions of 50 mm by 30 mm (excluding terminal welding portions).

Negative Electrode

A slurry having a composition of 100 parts by weight of graphite, 1.5 parts by weight of carboxymethyl cellulose (CMC) serving as a thickener, and 3.0 parts by weight of styrene-butadiene rubber (SBR) serving as a binder was prepared. The slurry was coated on one of surfaces of a copper current collector 4a at a basis weight on one surface of 13.0 mg/cm². After drying and pressing processes, the coated current collector 4a was cut out into the negative electrode 4 having dimensions of 52 mm by 32 mm (excluding terminal welding portions).

Separator

A non-woven fabric made of cellulose (a commercially available product) having a thickness of 35 μm was used as the separator 5.

Fabrication of Cell

First, the electrode body 6 made from a laminated body was fabricated by stacking the positive electrode 3, the separator 5, and the negative electrode 4 in this order.

Next, the cell was assembled by inserting the fabricated electrode body 6 into the portions of the aluminum laminate film 20 that was folded in two to form the exterior body.

Lastly, the cell was fabricated by sealing the three edges while setting a sealing width of the peripheral regions 20b of the aluminum laminate film 20 equal to 5 mm and using the heater bars 9 at 180° C. while disposing PTFE sheets on surfaces thereof. In this instance, the sealing was conducted while bringing the tab film 7b of the tab lead 7 that forms the electrode terminal strip into close contact with one end of the folded parts 20a while the heat-sealing piece 8 prepared by cutting a polypropylene film in a thickness of 0.2 mm into a piece having dimensions of 5 mm by 5 mm was heat-sealed to the other end of the folded part 20a. Meanwhile, the electrolytic solution (a solution prepared by dissolving $LiPF_6$ in a mixed solvent containing ethylene carbonate and diethyl carbonate at a weight ratio of 1 to 2) at a concentration of 1 mol/L was injected into the cell. After conducting reduced pressure impregnation, the cell was vacuum-sealed.

The battery size in this case was 37.5 mm×68.0 mm×0.42 mm (excluding the tabs).

Characterization

Each cell was charged until a cell voltage reached 4.2 V at a constant current of 50 mA. Then, the cell was subjected to constant current and constant voltage charging by applying a constant voltage of 4.2 V for 1 hour. Subsequently, the cell was discharged until the cell voltage falls down to 2.5 V at a constant current of 5 mA.

| Specifications of comparative sample 1 | |
|---|---|
| Positive electrode | same as the embodiment sample |
| Negative electrode | same as the embodiment sample |
| Separator | same as the embodiment sample |

Fabrication of Cell

The cell was assembled by inserting the electrode body 6 fabricated in the same way as that of the embodiment sample into the two aluminum laminate films 20 that form the exterior body. Then, the cell was fabricated by sealing the four sides while setting the sealing width of the peripheral regions 20b of the aluminum laminate film 20 equal to 5 mm and using the heater bars 9 at 180° C. while disposing the PTFE sheets on the surfaces.

The injection of the electrolytic solution and the vacuum sealing after the reduced pressure impregnation were conducted in the same way as the embodiment sample.

The battery size in this case was 42.5 mm×68.0 mm×0.42 mm (excluding the tabs).

Characterization Same as the Embodiment Sample

| Specifications of comparative sample 2 | |
|---|---|
| Positive electrode | same as the embodiment sample |
| Negative electrode | same as the embodiment sample |
| Separator | same as the embodiment sample |

Fabrication of Cell

Unlike the embodiment sample, the tab film 7b of the tab lead 7 that forms the electrode terminal strip was not brought into close contact with one end of the folded parts 20a and the polypropylene film (the heat-sealing piece 8) was not heat-sealed to the other end of the folded part 20a.

The battery size in this case was 37.5 mm×68.0 mm×0.42 mm (excluding the tabs).

Characterization Same as the Embodiment Sample

Table 1 shows result of the test.

TABLE 1

| | Capacity (mAh) | Cell size (mm) | Energy density (Wh/L) | Number of incidence of liquid leakages (cells) |
|---|---|---|---|---|
| Comparative samples 1 | 52.5 | 42.5 × 68.0 × 0.42 | 130 | 0/6 |
| Comparative samples 2 | 52.5 | 37.5 × 68.0 × 0.42 | 147 | 5/6 |
| Embodiment samples | 52.5 | 37.5 × 68.0 × 0.42 | 147 | 0/6 |

Comparison of comparative samples 1 with embodiment samples and comparative samples 2 in Table 1: All the cells employed the same electrode body 6 and therefore had the same capacity. Meanwhile, in comparative samples 2 and the embodiment samples, the laminate film 20 adopted the folded structure and the three sides were heat-sealed. As a consequence, the battery areas were reduced by curtailing the heat-sealing region equivalent to one side, and the energy density of these cells was confirmed to be increased by about 13%.

Comparison of embodiment samples with comparative samples 2 in Table 1: As is apparent from Table 1, liquid leakages from the folded parts 20a were observed in comparative samples 2. In contrast, it was confirmed that no liquid leakages occurred in the embodiment samples.

The above-described embodiments are intended to facilitate an understanding of the present disclosure and are not in any way to be construed as limiting the present disclosure. The present disclosure may be modified and varied without departing from the scope of the disclosure, and equivalents thereof are also encompassed by the disclosure.

What is claimed is:

1. A thin-type battery comprising:
   a flat shaped electrode body formed by stacking a positive electrode and a negative electrode while interposing a separator in between the positive electrode and the negative electrode;
   an electrolyte; and
   an exterior body made from a laminate film including a metal foil and enclosing the electrode body and the electrolyte, with ends of the exterior body being hermetically sealed by heat-sealing,
   the exterior body including a folded part being a bent part that is folded from one surface side of the electrode body to another surface side of the electrode body along one edge of the electrode body, and
   the folded part including resin-interposed heat-sealing portions located in regions in two ends in a direction along the edge of the electrode body and outside the electrode body where portions of the exterior body are opposed to each other,
   each resin-interposed heat-sealing portion being heat-sealed by interposing a heat-sealing piece, made from a hot-melt synthetic resin, adjacent to the bent part so as to seal to the bent part
   wherein the heat-sealing piece is made from polypropylene.

2. The thin-type battery according to claim 1, wherein the electrode body has a rectangular shape,
   in the exterior body, the folded part is located along the edge forming one of four sides of the electrode body, and regions overlapping each other to outside of the remaining three sides of the electrode body are hermetically sealed by heat-sealing.

3. The thin-type battery according to claim 1, wherein
a tab lead is attached to each of the positive electrode and the negative electrode, and
the heat-sealing piece is a tab film included in the tab lead.

4. The thin-type battery according to claim 2, wherein
a tab lead is attached to each of the positive electrode and the negative electrode, and
the heat-sealing piece is a tab film included in the tab lead.

* * * * *